B. F. BARKER.
TYPE WRITING MACHINE.
APPLICATION FILED MAR. 5, 1913.
1,192,976.
Patented Aug. 1, 1916.
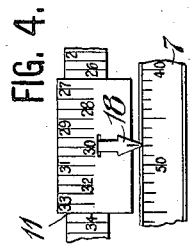
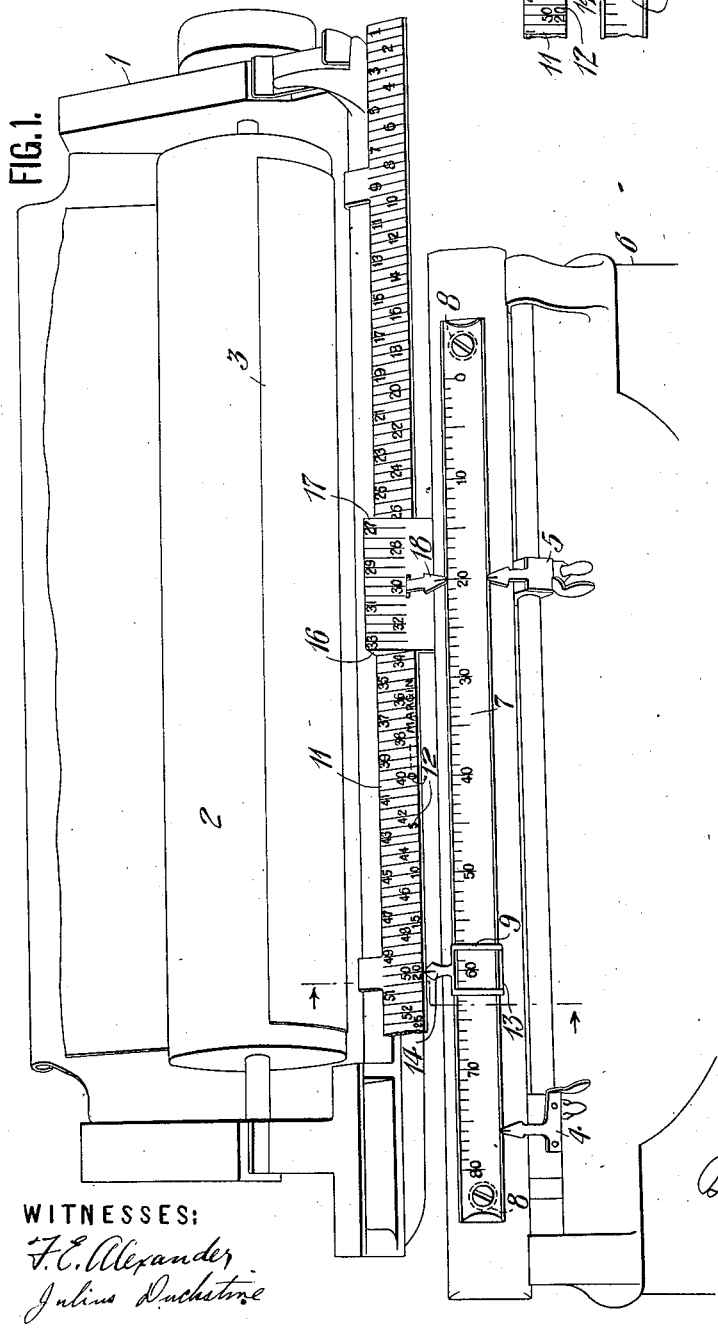
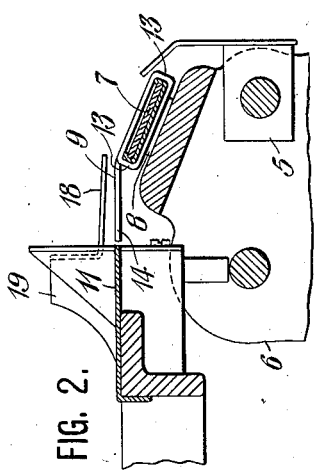
WITNESSES:
F. E. Alexander
Julius Duchstne
INVENTOR:
Benjamin F Barker
BY
D. C. Stickney
ATTORNEY

UNITED STATES PATENT OFFICE.

BENJAMIN F. BARKER, OF EL PASO, TEXAS, ASSIGNOR TO UNDERWOOD TYPEWRITER COMPANY, OF NEW YORK, N. Y., A CORPORATION OF DELAWARE.

TYPE-WRITING MACHINE.

1,192,976.               Specification of Letters Patent.       Patented Aug. 1, 1916.

Application filed March 5, 1913. Serial No. 752,019.

*To all whom it may concern:*

Be it known that I, BENJAMIN F. BARKER, a citizen of the United States, residing in El Paso, in the county of El Paso and State of Texas, have invented certain new and useful Improvements in Type-Writing Machines, of which the following is a specification.

This invention relates principally to means for centering headings on work-sheets in typewriting machines.

According to the invention, there is employed in connection with a centering scale, (which may be on the carriage), an index, (which may be on the machine frame), and this index is arranged to point to a special "0" when the typewriter carriage is in position to begin a full line of writing. In carrying out the invention, the operator depresses the carriage-spacing key once for each letter in the word to be centered, and then notes where said index points on the centering scale. This will inform the operator as to the position at which to begin writing the word on the work-sheet; the operator then setting the carriage to said position by means of the usual scale and index. Said "0" is the first point on a special scale which is preferably used in connection with said centering scale. Said special scale is of use in connection with centering headings in cases where extra margin is provided for at the left-hand side of a work-sheet. The operator usually sets the margin gage for regulating this margin; and according to this part of the invention, the operator, after setting said margin gage, proceeds to adjust the new index to such point on said special scale as agrees with the position to which he has already set the margin gage. Then the operator taps the word on the space key, and the new index will thereupon indicate on the centering scale the number of the space at which the writing of the word should be begun. Being thus informed of said beginning point, the operator adjusts the carriage to such point, and begins writing the word. In this way, headings may be easily centered for different widths of margin or lengths of writing line. One of the scales which is preferably employed has the usual scale for indicating the letter-space in the travel of the typewriter carriage at which the printing point stands, while another scale is adapted to be used to properly center work in a line of a given length so that such work as a heading may be exactly centered therein. One of these scales is on the frame of the machine, and has letter-spaces indicated thereon by means of a pointer carried on the carriage, while the other scale is on the carriage, and a pointer on the frame of the machine indicates the letter-spaces on said scale. One of said scales has an auxiliary series of graduations on which one of said pointers may be set to correspond with the setting of a margin stop, and said pointer may be arranged to indicate directly on the scale carrying said auxiliary series of graduations, the central letter-space of a line beginning at said marginal stop. With the help of said pointer and said scale, the point of beginning any work of said line so that it will be centered precisely on said line can be easily read off without mental calculations.

Other features and advantages will hereinafter appear.

In the accompanying drawings, Figure 1 is a view showing so much of an Underwood typewriting machine with my invention applied thereto, as is necessary to the understanding of my invention. Fig. 2 is a detail section of the same. Fig. 3 shows the frame pointer indicating where to begin a word. Fig. 4 shows the carriage set to begin said word.

The carriage 1 of the usual Underwood typewriting machine carries a platen 2 rotatably mounted thereon, and around said platen is passed a work-sheet 3. Said carriage 1 is mounted to travel along the frame 6 of the typewriter and carries a pointer 18 which indicates on the usual indicating scale 7 the position at which the printing point of the carriage stands, said scale usually consisting of a series of graduations marked or otherwise indicated, on a suitable strip or plate. Said carriage travels along such frame between right-hand margin stop 5 and left-hand margin stop 4. In using the present invention, the left-hand margin stop 4 is preferably kept at the extreme left-hand of the machine, and the work-sheet 3 is so inserted around the platen that the lines of writing will terminate thereon when the carriage is brought to rest against said margin stop 4. Said margin stop 4, as shown herein, apparently stands a few letter-spaces to the right of the limit of travel of the typewriter carriage, which limit is at letter-space "80". The typewriter, however, has a margin-release key (not shown herein) which may be operated to permit the carriage to travel past the margin stop 4 to said letter-spacer "80".

Fast on the carriage of the typewriter is a scale plate 11 graduated at letter-space intervals, but on which the alternate letter-spaces are consecutively numbered, each one of the said alternate letter-spaces preferably bearing its indicating numeral; and the alternate numerals may be offset, as shown in Fig. 1, for clearness.

For a portion of the length of scale 11, beginning as at the letter-space "40" thereon, is an auxiliary series of graduations 12 having notation extending in the same direction, but in these graduations the successive letter-spaces are consecutively numbered, preferably in red, to contrast with the numbering of the scale 11 which is in black. This auxiliary series of graduations coöperates with an adjustable indicator 9 which may be slidable along the indicating scale 7, so that the point 14 of said indicator may indicate letter-spaces on said auxiliary graduations 12.

In the drawings (Fig. 1) the right-hand margin stop 5 is shown set at letter-space "20". To find the center of the line extending from "20" to "80" on scale 7, the carriage is brought up against said margin stop, then the indicator 9 is set so as to read at "20" on the auxiliary graduations 12. This indicates the letter-space "50" on scale 11, and therefore the letter-space "50" on the indicating scale 7 is the central letter-space of the line. Similarly, if the right-hand margin stop is positioned at any other point along the indicating scale 7, and if the carriage is brought against it at such other point, then the indicator 9, if placed at the corresponding point on the auxiliary graduations 12, will indicate on the scale 11 the central point of the line on scale 7 extending from said margin stop 5 to the limit of the travel of the carriage. Said indicator 9 may also be used to properly center a heading on any such line. For instance, after the indicator 9 has been positioned as above described, if a heading of four letter-spaces is to be inserted in the line beginning with the letter-space "20" and ending with the letter-space "80", the carriage is brought as before against the margin stop which is at space "20" on indicating scale 7, the indicator 9 is then positioned at space "20" of the auxiliary graduations 12, and then the space-bar of the typewriter is operated four times. This moves the carriage so that the letter-space "20" on said auxiliary graduations moves away from the indicator 9, and said indicator will, after said operation of the space-bar, indicate the letter space "48" on the scale 11 as shown in Fig. 3. If now the typewriter carriage is positioned with its pointer 18 at letter-space "48" on the indicating scale 7, the said heading of four letters will be located centrally in said line. The indicator 9 operates thus, because when read on the scale 11, it will indicate a number of letter-spaces distant from the letter-space at which the carriage is set just half as many as the number of times the space-bar of the typewriter was operated. The scale 11 is preferably so placed that the number "1" thereon is near the right-hand end of the typewriter carriage, and the auxiliary graduations 12 begin on said scale 11 at the letter-space number corresponding with the central letter-space of the indicating scale 7. Said scales 7 and 11 may extend to the right sufficiently to show on said scale 11 any margin likely to be used in work on the typewriter.

It will be understood that the work-sheet 3 is to be so placed that the writing thereon will terminate short of the right-hand edge of said sheet with the margin stop 4 placed at the extreme left-hand position.

The indicator 9 may comprises bars 15 which extend transversely of scale plate 11 on either side of the point of the indicator, the ends 13 of said bars being turned under said plate, as seen in Fig. 2, where they are joined together. The scale plate 7 is held slightly raised above the surface of the frame 6 by washers 8 which underlie its ends through which the screws holding said ends pass.

The central portion of the scale plate 11 may be vertically offset at 16 and 17 so as to stand clear of the usual lug 19 carrying the pointer 18, and, as the aforesaid portion is thus caused to face the operator vertically, the said pointer 18 extends through said scale plate, so that it forms in effect a fixed extension of said scale plate.

Variations may be resorted to within the scope of the invention, and portions of the improvements may be used without others.

Having thus described my invention I claim:

1. In a typewriting machine, the combination with a scale on the frame, a carriage, and a pointer on said carriage for indicating the printing point, said scale comprising graduations numbered from "1" to the limit of the carriage travel, of a scale on the carriage numbered in the same direction, but with graduations numbered with half the values of those on said frame scale, an auxiliary scale on the carriage having its zero located at the graduation thereon numbered the same as the middle division of the frame scale, said auxiliary scale graduated from said point like the frame scale, and a pointer slidable to coöperate with said frame scale and said auxiliary scale.

2. In a typewriting machine, the combination with a scale on the carriage, of a scale on the frame of the machine, a pointer for indicating on one scale the letter space at which the printing point stands, and a pointer slidable with relation to the other scale to coöperate therewith in denoting thereon an arbitrary writing line center.

3. In a typewriting machine, the combination of a carriage, a scale for indicating the letter-space at which the printing point stands, and a scale on which the alternate letter-spaces are numbered, the second-named scale having a marginal notation which extends, from a letter-space thereon corresponding to the central letter-space of the full writing line of the machine, in the same direction as the first-named scale, and which is consecutive with every letter-space on that scale.

4. In a typewriting machine, the combination with a traveling carriage, of a scale, a pointer coöperating with said scale for indicating the letter space at which the printing point stands, a second scale on which the alternate letter spaces are numbered consecutively, said second scale having a marginal notation by which the successive letter spaces are numbered consecutively, and an indicator coöperating with said second scale for indicating thereon both a letter space designated by the marginal notation and successive letter spaces in the travel of the typewriter carriage.

5. In a typewriting machine, the combination with a traveling carriage and a scale on the frame of the machine, of a pointer on said traveling carriage, a scale on the traveling carriage, and an indicator slidable on the frame of the machine to indicate a letter space on said carriage scale, said carriage scale having auxiliary notation associated therewith.

6. In a typewriting machine, the combination with a traveling carriage, of a scale indicating the letter spaces throughout the travel of said carriage, a pointer coöperating with said scale to indicate the printing point at which the carriage stands, a scale with letter spaces and having alternate letter spaces consecutively numbered, and an indicator slidable along the first-named scale, the second-named scale having auxiliary successive space notation beginning from the number thereon corresponding to the central letter space on the first-named scale, said auxiliary notation coöperating with said indicator and extending in the same direction as said second-named scale.

7. In a typewriting machine, the combination with a traveling carriage, of a scale on the frame of the machine, a pointer on said traveling carriage for indicating on said scale the letter space at which the printing point stands, a scale on said carriage having alternate letter spaces thereon numbered consecutively, the second-named scale also having auxiliary successive space-numbered notation beginning at the number thereon corresponding to the central point of the first-named scale, said auxiliary notation extending in the same direction as both of said other scales, and an indicator slidable along the first-named scale to indicate the letter space on both the second-named scale and the auxiliary notation.

8. In a typewriting machine, the combination with a traveling carriage, of a margin stop limiting the travel of said carriage, a scale indicating the letter spaces in the travel of said carriage, a scale having the alternate letter spaces consecutively numbered thereon and having auxiliary notation beginning with the number thereon corresponding to the center of the first-named scale, and a pointer slidable along said first-named scale for indicating on the second-named scale the position of said margin stop.

9. In a typewriting machine, the combination with a scale on the frame of the machine for indicating the letter space at which the printing point stands, of a traveling carriage, a scale on said carriage having the alternate letter spaces numbered thereon in the same direction as those on the indicating scale, and having auxiliary notation beginning thereon at the number corresponding to the central point of said indicating scale, and a margin stop for arresting the travel of the typewriter carriage at the printing point indicated on said indicating scale, to permit the coöperation of said scales for the purpose set forth.

10. In a typewriting machine, the combination with a traveling carriage, of a margin stop for arresting said traveling carriage, a scale connected to move with said carriage relatively to said margin stop, and an indicator slidable to denote on said scale an arbitrary writing line center.

11. In a typewriting machine, the combination of two consecutive scales of which one is numbered at letter space intervals and the other at alternate letter space intervals, said other scale also having consecutive letter space notation, an indicator for said first-named scale, and a single indicator for coöperation simultaneously with both the alternate and successive notation of said other scale.

12. In a typewriting machine, the combination with a carriage; of a scale fixed to said carriage to travel therewith and having letter-space divisions, the alternate ones of which are consecutively numbered, said scale also having an auxiliary series of graduations; and an indicator slidable with relation to said scale and coöperating both with the same and with its said auxiliary graduations.

13. In a typewriting machine, the combination, with a carriage; of a scale fixed to said carriage to travel therewith and having letter-space divisions, the alternate ones of which are consecutively numbered, said scale also having an auxiliary series of graduations which extends in the same direction as the scale divisions, starting from a predetermined division of said scale, and the consecutive ones of which are consecutively numbered; and an indicator slidable with relation to said scale and coöperating both with the same and with its said auxiliary graduations.

14. A scale for typewriting machines having letter spaces with notation in sequence for alternate spaces, said scale also having auxiliary notation in sequence for successive spaces, and an indicator, said scale and indicator being supported in a manner to allow adjustment of their relative positions, whereby said indicator is capable of coöperation with the notation for both said alternate and successive spaces.

15. A scale for typewriting machines having letter spaces with notation in sequence for alternate spaces, said scale also having marginal notation in sequence for successive spaces, and an indicator, said scale and indicator being supported in a manner to allow adjustment of their relative positions, whereby said indicator is capable of coöperating with the notation for both said alternate and successive spaces.

16. In a typewriting machine, the combination with a letter-feeding carriage, of a scale thereon having notation in sequence for alternate spaces, said scale also having auxiliary notation in sequence for successive spaces, and an indicator movable along said scale to denote on said scale by aid of said auxiliary notation a line-centering letter space for said carriage.

17. In a typewriting machine, the combination of a scale on the machine frame; a carriage; a scale, parallel with the first-named scale, connected to travel with said carriage; and an indicator on each scale for coöperation with the other scale.

18. In a typewriting machine, the combination of a fixed scale on the machine frame; a carriage; a scale, parallel with the frame scale, fixed to said carriage to travel therewith relatively to the said frame scale; and an indicator on each scale for coöperation with the other scale.

19. In a typewriting machine, the combination of a scale on the machine frame; a carriage; a scale, parallel with the first-named scale, connected to travel with said carriage and having an auxiliary series of graduations; an indicator on the first-named scale for coöperation with the second-named scale and its auxiliary series of graduations; and an indicator on said second named scale for coöperation with said first-named scale.

20. In a typewriting machine, the combination of a fixed scale on the machine frame; a carriage; a scale, parallel with the first-named scale, fixed to said carriage to travel therewith relatively to said first-named scale and having an auxiliary series of graduations; an indicator on the first-named scale for coöperation with the second-named scale and its auxiliary series of graduations; and an indicator on said second-named scale for coöperation with said first-named scale.

21. In a typewriting machine, the combination, with a carriage; of a scale fixed to said carriage to travel therewith; and an indicator coöperative with said scale slidably mounted upon the frame of the machine for adjustment with relation to said scale.

22. In a typewriting machine, the combination, with a carriage; of a scale fixed to said carriage to travel therewith and having letter-space divisions, the alternate ones of which are consecutively numbered; and an indicator coöperative with said scale slidably mounted upon the frame of the machine for adjustment with relation to said scale.

23. In a typewriting machine, the combination, with a carriage; of a scale fixed to said carriage to travel therewith; a scale on the machine frame; an indicator on the carriage scale for coöperation with the frame scale; and an indicator for coöperation with said carriage scale slidably mounted upon said frame scale for adjustment with relation to said carriage scale.

BENJAMIN F. BARKER.

Witnesses:
F. B. White,
Richard Shea.